(12) United States Patent
Shaw

(10) Patent No.: US 9,603,202 B2
(45) Date of Patent: Mar. 21, 2017

(54) INDUCTION COOKING APPLIANCE AND METHOD FOR ASSEMBLING SAME

(71) Applicant: General Electric Company, Schenectady, NY (US)

(72) Inventor: Anthony Michael Shaw, Chattanooga, TN (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 271 days.

(21) Appl. No.: 14/466,102

(22) Filed: Aug. 22, 2014

(65) Prior Publication Data

US 2016/0057815 A1 Feb. 25, 2016

(51) Int. Cl.
*H05B 6/12* (2006.01)

(52) U.S. Cl.
CPC ......... *H05B 6/1254* (2013.01); *H05B 6/1245* (2013.01); *H05B 2206/022* (2013.01); *Y02B 40/126* (2013.01)

(58) Field of Classification Search
CPC ............... H05B 6/1254; H05B 6/1245; H05B 2206/022; Y02B 40/126
USPC .......... 219/452.12, 490, 620–624, 664, 672; 99/323.9, 450.3
See application file for complete search history.

(56) References Cited

U.S. PATENT DOCUMENTS

| 3,947,652 | A | * | 3/1976 | Cobb | H05B 6/1245 |
| | | | | | 126/39 J |
| 4,363,956 | A | * | 12/1982 | Scheidler | F24C 15/108 |
| | | | | | 219/452.12 |
| 5,791,336 | A | * | 8/1998 | Helm | F24C 15/108 |
| | | | | | 126/214 A |
| 6,207,934 | B1 | * | 3/2001 | Steiner | F24C 15/102 |
| | | | | | 219/452.11 |
| 6,236,024 | B1 | * | 5/2001 | Gotz | H05B 3/74 |
| | | | | | 126/39 H |
| 6,410,892 | B1 | * | 6/2002 | Peschl | F24C 15/102 |
| | | | | | 126/218 |
| 2005/0006379 | A1 | * | 1/2005 | Sullivan | H05B 6/1209 |
| | | | | | 219/620 |

FOREIGN PATENT DOCUMENTS

WO WO 2010/137271 A1 12/2010

* cited by examiner

*Primary Examiner* — Thien S Tran
(74) *Attorney, Agent, or Firm* — Dority & Manning, P.A.

(57) ABSTRACT

Induction cooking appliances and methods for assembling induction cooking appliances are provided. An induction cooking appliance defines a vertical direction, a lateral direction, and a transverse direction, the vertical, lateral and transverse directions each generally perpendicular to each other. The induction cooking appliance includes a cooktop having an upper surface and an opposing lower surface, and an induction element positioned below the cooktop in the vertical direction, the induction element contacting the lower surface of the cooktop. The induction cooking appliance further includes a mount bracket connected to the lower surface of the cooktop, and a mount plate connected to the mount bracket and positioned below the induction element in the vertical direction, the induction element connected to the mount plate.

17 Claims, 6 Drawing Sheets

INDUCTION COOKING APPLIANCE AND METHOD FOR ASSEMBLING SAME

FIELD OF THE INVENTION

The present disclosure relates generally to induction cooking appliances, and more specifically to improved mounting apparatus for mounting induction elements in induction cooking appliances and associated methods for assembling induction cooking appliances.

BACKGROUND OF THE INVENTION

Induction cooking appliances are more efficient, have greater temperature control precision and provide more uniform cooking than other conventional cooking appliances. In conventional cooktop systems, an electric or gas heat source is used to heat cookware in contact with the heat source. This type of cooking is inefficient because only the portion of the cookware in contact with the heat source is directly heated. The rest of the cookware is heated through conduction that causes non-uniform cooking throughout the cookware. Heating through conduction takes an extended period of time to reach a desired temperature.

In contrast, induction cooking systems use electromagnetism which turns cookware of the appropriate material into a heat source. A power supply provides a signal having a frequency to a coil of an induction element. When the coil is activated a magnetic field is produced which induces a current on the bottom surface of the cookware. The induced current on the bottom surface then induces even smaller currents (Eddy currents) within the cookware thereby providing heat throughout the cookware.

It is generally desirable for the induction elements of an induction cooking appliance to be in contact with the cooktop of the induction cooking appliance. Accordingly, typical known induction cooking appliances utilize spring-loaded features to mount the induction elements within the induction cooking appliance and bias the induction elements towards the cooktop. Such spring-loaded features typically include a number of small parts, include various springs and spring retention components. Assembly of such parts and the overall induction cooking appliance can thus be difficult and time-consuming. Further, these parts are susceptible to becoming dislodged during assembly or later operation of the appliance. Additionally, during operation of the appliance, heat generated by the induction elements can cause the springs to sag, requiring maintenance and/or replacement of the spring-loaded features.

Accordingly, improved methods and apparatus for mounting induction elements within induction cooking appliances, and generally for assembling such induction cooking appliances, are desired. Specifically, methods and apparatus which are simple, efficient, and do not require spring-loaded features would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an induction cooking appliance is provided. The induction cooking appliance defines a vertical direction, a lateral direction, and a transverse direction, the vertical, lateral and transverse directions each generally perpendicular to each other. The induction cooking appliance includes a cooktop having an upper surface and an opposing lower surface, and an induction element positioned below the cooktop in the vertical direction, the induction element contacting the lower surface of the cooktop. The induction cooking appliance further includes a mount bracket connected to the lower surface of the cooktop, and a mount plate connected to the mount bracket and positioned below the induction element in the vertical direction, the induction element connected to the mount plate.

In accordance with another embodiment, a method for assembling an induction cooking appliance is provided. The method includes connecting a mount bracket to a lower surface of a cooktop, the cooktop comprising an upper surface and the opposing lower surface, and connecting an induction element to a mount plate. The method further includes connecting the mount plate to the mount bracket such that the induction element contacts the lower surface of the cooktop and is generally free from bias along a vertical direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
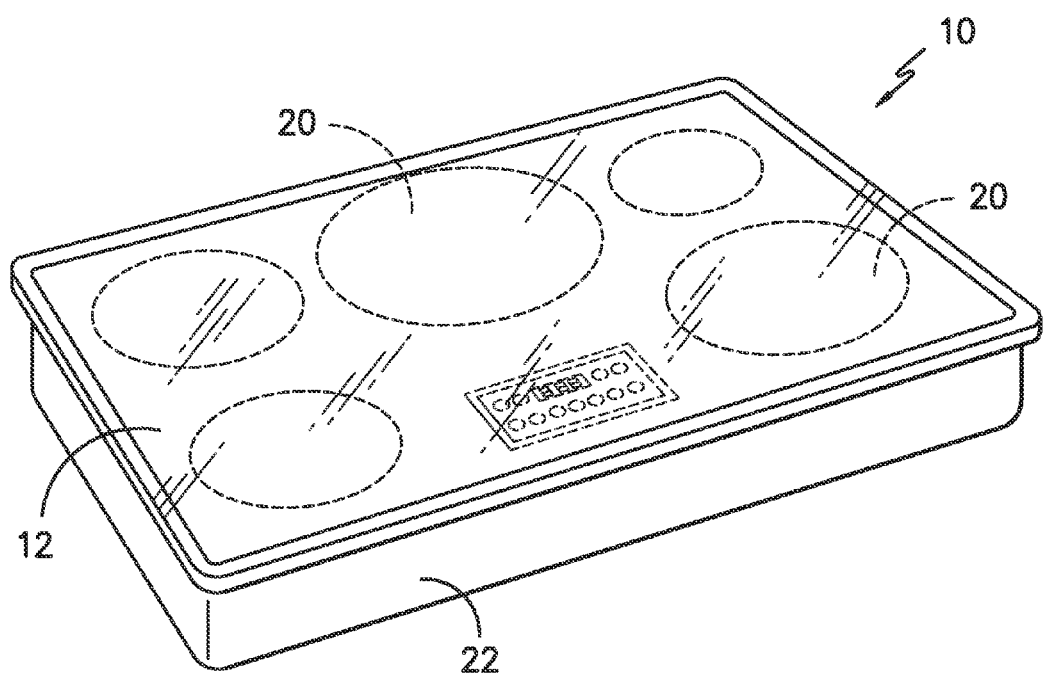
FIG. 1 is a top perspective view of an induction cooking appliance in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides an exemplary embodiment of an induction cooking appliance 10 of the present invention. As shown, the induction cooking appliance 10 defines a vertical direction V, a lateral direction L, and a transverse direction T. These directions are each generally perpendicular to each other, thus forming an orthogonal coordinate system. Induction cooking appliance 10 may be installed in various configurations such as in cabinetry in a kitchen and/or coupled with one or more ovens or as a stand-alone appliance.

As illustrated in FIG. 1, appliance 10 may for example include a cooktop 12. The cooktop 12 may be formed from glass or another suitable surface, and may generally extend within a plane defined by the lateral and transverse axes L, T. Items for cooking, such as pots and pans, may be placed on an upper surface 14 of the cooktop 12 for heating. Cooktop 12 may additionally include an opposing lower surface 16 that is opposite the upper surface 14.

As discussed in detail herein, one or more induction elements 20 may be positioned below the cooktop 12 in the vertical direction V. A housing 22 may generally surround the induction elements 20, as well as various other components as discussed therein.

Appliance 10 as illustrated in FIG. 1 is provided by way of example only. The present invention may be used with other configurations, such as for example an appliance having one or more induction elements in combination with one or more electric or gas burner assemblies. In addition, the present invention may also be used with a cooktop having a different number and/or positions of induction elements.

Figure 2:
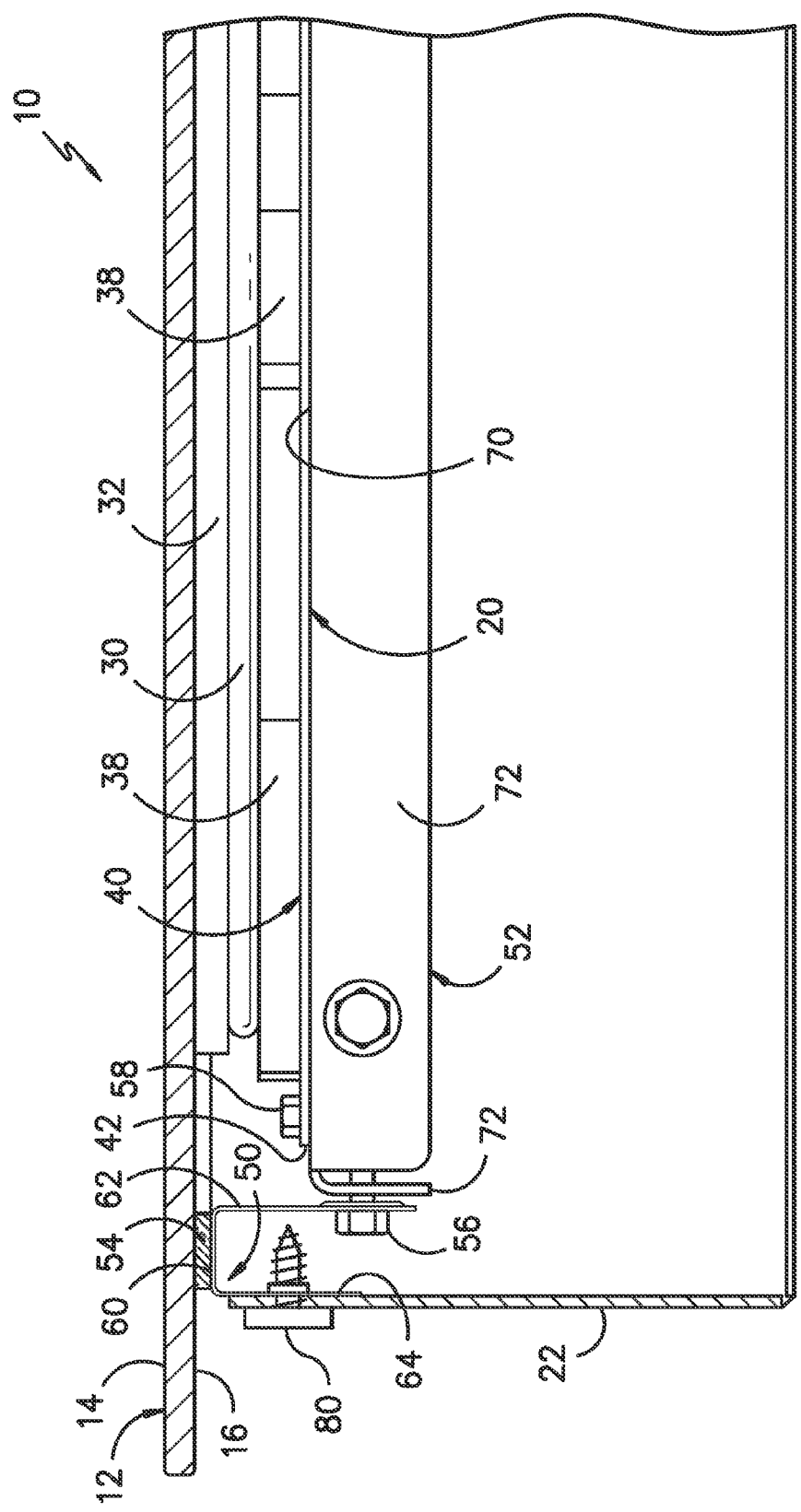
FIG. 2 is a side see-through assembled view of a portion of an induction cooking appliance in accordance with one embodiment of the present disclosure.
Figure 3:
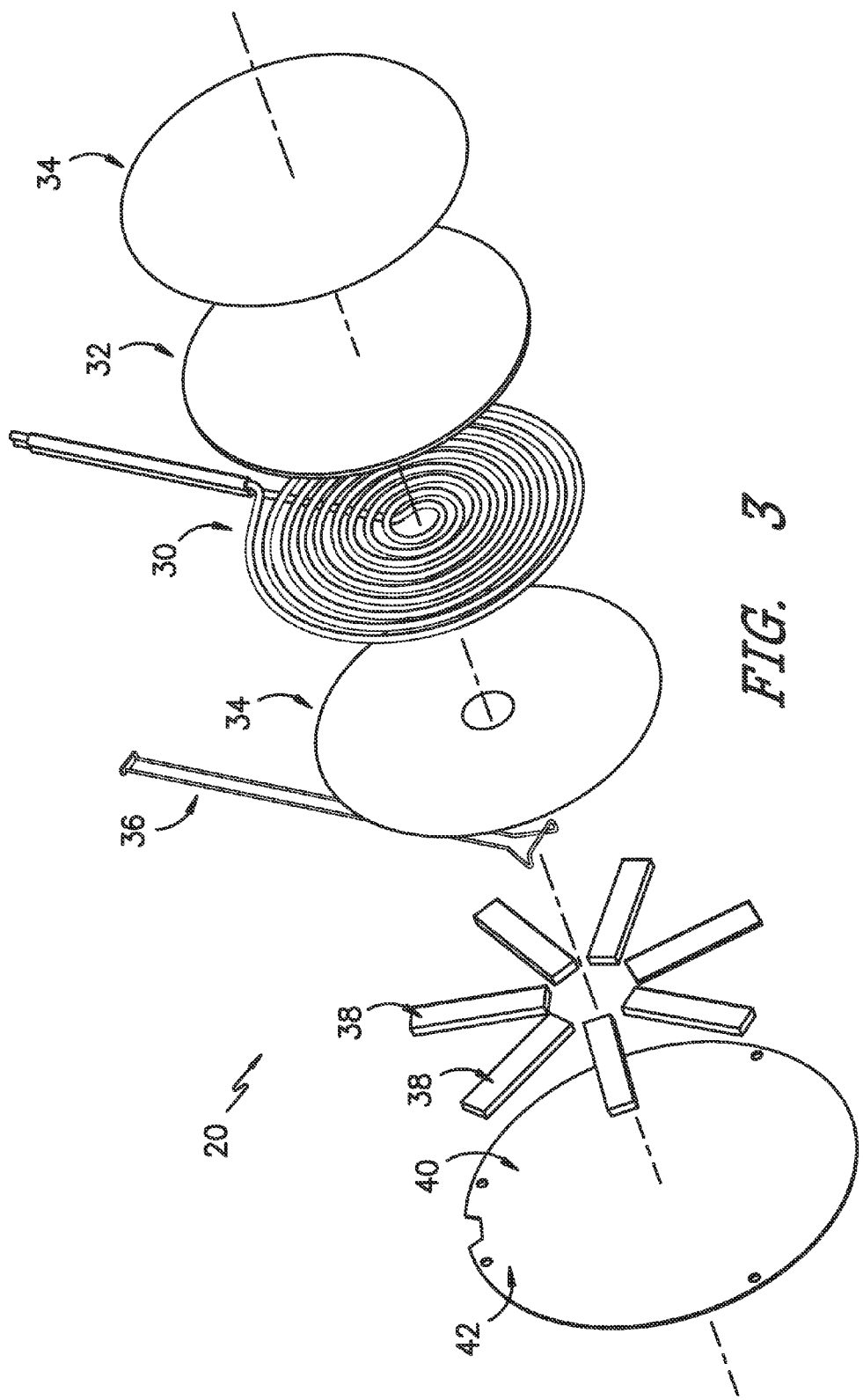
FIG. 3 is an exploded view of an induction element in accordance with one embodiment of the present disclosure.

FIG. 2 provides a side view of various components of an induction cooking appliance 10, and FIG. 3 provides an exploded view of an induction element 20 for use in an appliance 10. As illustrated, induction element 20 may include, for example, an induction coil 30. The coil 30 may be in communication with an electrical power source, and may produce an electromagnetic field, as is generally understood. An insulation layer 32 may be provided vertically above the coil 30, and may be formed for example from fiberglass. Electrical isolator layers 34 may be provided vertically above and below the coil 30, and for example above the insulation layer 32, and may be formed from for example mica. A thermistor wire 36 may additionally be provided in the element 20. Ferrite bars 38 may additionally be provided in the element, and may be positioned vertically below the coil 30 as well as, for example, the lower electrical isolator layer 34. The bars 38 may block electromagnetic flow therethrough, thus directing the flow vertically upward. A base plate 40 may be disposed vertically below the other various components of the induction element 20, and the other various components may be disposed on the base plate 40. Base plate 40 may, for example, include a flange portion 42, which may be a peripherally outward portion of the base plate 40 that is utilized for locating the induction element 20 relative to and connecting to the induction element 20 to other components of the appliance 10 as discussed herein.

When assembled, each induction element 20, such as an upper component thereof, contacts the lower surface 16 of the cooktop 12. Further, the present disclosure is directed to various components for advantageously supporting the induction elements 20 relative to the cooktop 12. In particular, such components may support the induction elements 20 relative to the cooktop 12 without utilizing any biasing forces, such as from spring-like features. Such components and resulting appliance are advantageously more efficient and easier to assemble, and further have less risk of damage or deformity during use.

Figure 4:
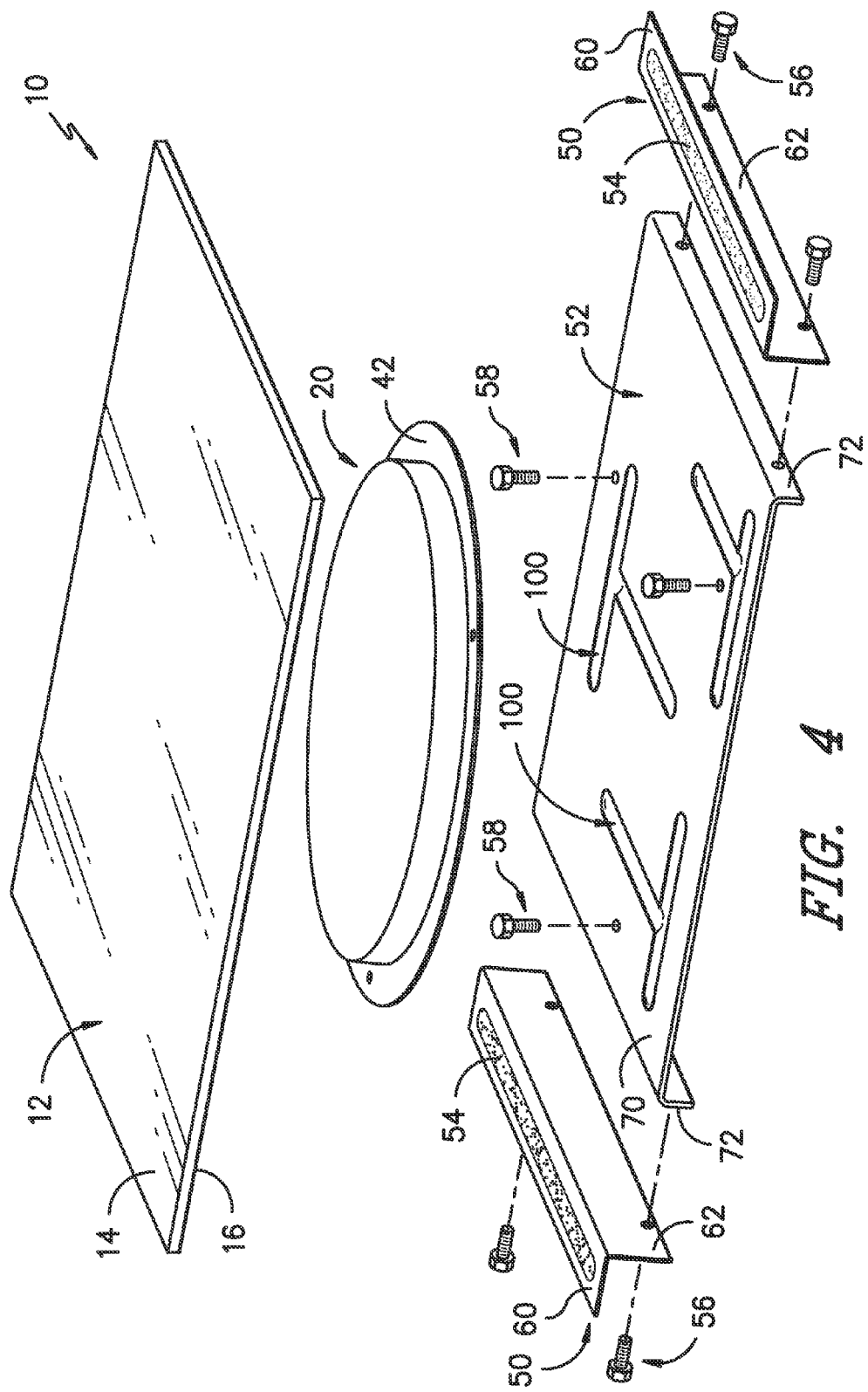
FIG. 4 is a perspective exploded and disassembled view of components of an induction cooking appliance in accordance with one embodiment of the present disclosure.
Figure 5:
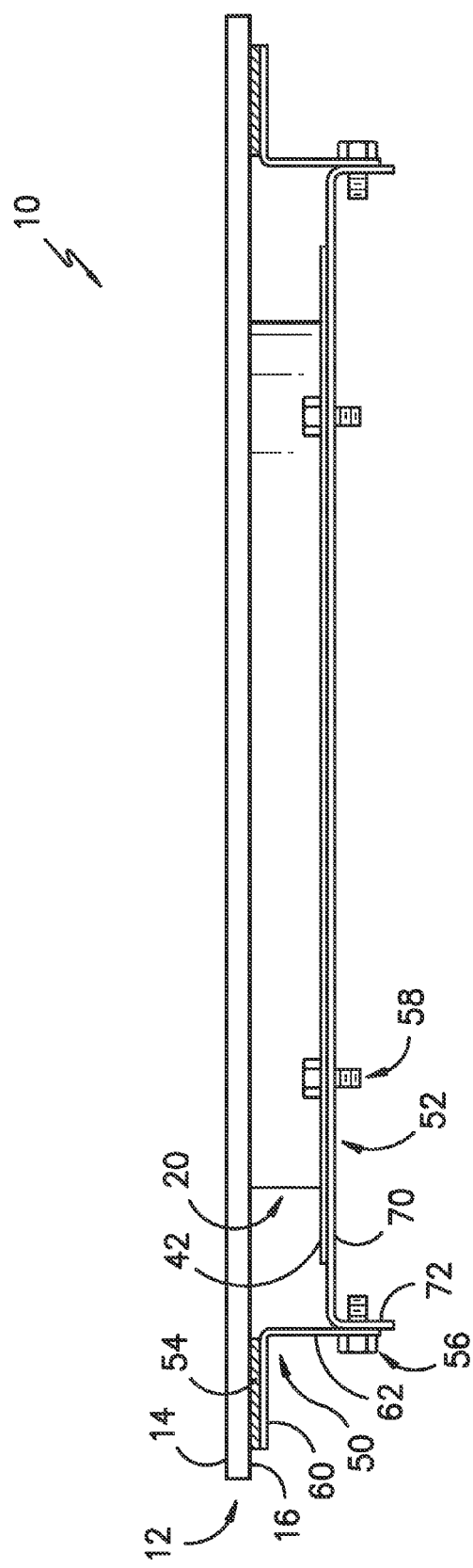
FIG. 5 is a side assembled view of the components of the induction cooking appliance of FIG. 4.

For example, and referring now to FIGS. 2 and 4 through 5, appliance 10 may further include one or more mount brackets 50 and one or more mount plates 52. As shown, each mount bracket 50 may be connected to the lower surface 16 of the cooktop 12. A mount plate 52 may be connected to one or more mount brackets 50, which may thus support the mount plate 52 relative to the cooktop 12. When assembled, and as shown, the mount plate 52 may be positioned below one or more induction elements 20 in the vertical direction V. Further, one or more induction elements 20 may be connected to the mount plate 52. The mount brackets 50 and the mount plates 52 may generally support the one or more induction elements 20 relative to the cooktop 12, such that each induction element 20 is advantageously in contact with the lower surface 16 of the cooktop 12. In specific exemplary embodiments, and as shown, an induction element 20 may be positioned directly between and in contact with the lower surface 16 of the cooktop 12 and a mount plate 52. Further, each induction element 20 may advantageously be generally free from bias along the vertical direction V. Accordingly, the mount brackets 50 and mount plates 52 may generally hold the induction elements 20 relative to and in contact with the cooktop 12 in an un-biased manner, with no spring-force or otherwise biasing force biasing the induction element 20 in the vertical direction V, such as towards the cooktop 12.

As illustrated, and in exemplary embodiments, an adhesive 54 may be utilized to connect a mount bracket 50 and the lower surface 16 of the cooktop 12. The adhesive 54 may, for example, be a suitable silicone adhesive. Adhesive 54 may thus form a layer between and connecting the mount bracket 50 and lower surface 16. Alternatively, other suitable methods or apparatus may be utilized to connect the mount bracket 50 and the lower surface 16. For example, suitable mechanical fasteners may be utilized, or welding, brazing, or other suitable methods may be utilized.

As further illustrated, an in exemplary embodiments, one or more mechanical fasteners 56 may be utilized to connect a mount plate 52 and a mount bracket 50. Suitable mechanical fasteners include, for example, screws, nails, rivets, nut/bolt combinations, etc. A mechanical fastener 56 may generally extend through the mount plate 52 and mount bracket 50 to connect these components together. Alternatively, other suitable methods or apparatus may be utilized to connect the mount plate 52 and mount bracket 50. For example, an adhesive may be utilized, or welding, brazing, or other suitable methods may be utilized.

Still further, one or more mechanical fasteners 58 may be utilized to connect a mount plate 52 and an induction element 20. A mechanical fastener 58 may generally extend through the mount plate 52 and the induction element 20, such as the flange portion 42 of the base plate 40, to connect these components together. Alternatively, other suitable methods or apparatus may be utilized to connect the mount plate 52 and induction element 20. For example, an adhesive may be utilized, or welding, brazing, or other suitable methods may be utilized.

As shown, mount bracket 50 may include two or more portions. For example, mount bracket 50 may include a first plate 60 and a second plate 62 which are generally perpendicular to each other. The first plate 60 may, for example, be generally oriented within a plane defined by the lateral direction L and the transverse direction L. The second plate 62 may, for example, extend generally perpendicularly from the first plate 60 generally along the vertical direction V.

Further, in exemplary embodiments as illustrated, the first plate 60 may be the portion of the mount bracket 50 that is connected to the lower surface 16 of the cooktop 12. The second plate 60 may be the portion of the mount bracket 50 that is connected to the mount plate 52.

In some embodiments, as illustrated in FIGS. 4 and 5 for example, the mount bracket 50 may only include the first plate 60 and second plate 62. Accordingly, mount bracket 50 in some embodiments may for example be generally L-shaped. In other embodiments, as illustrated in FIG. 2 for example, the mount bracket 50 may include additional portions, such as a third plate 64. The third plate 64 may, for example, extend generally perpendicularly from the first plate 60 generally along the vertical direction V. Third plate 64 may further be spaced apart from the second plate 62 by the first plate 60. Accordingly, mount bracket 50 in some embodiments may for example be generally U-shaped, or alternatively generally Z-shaped (with the connecting components of the Z-shape in exemplary embodiments being generally perpendicular to each other).

As further shown, mount plate 52 may include two or more portions. For example, mount bracket 50 may include a first plate 70 and one or more second plates 72 which are generally perpendicular to each other. The first plate 70 may, for example, be generally oriented within a plane defined by the lateral direction L and the transverse direction L. Each second plate 72 may, for example, extend generally perpendicularly from the first plate 70 generally along the vertical direction V.

Further, in exemplary embodiments as illustrated, the first plate 70 may be the portion of the mount plate 52 that is connected to the induction element 20, such as to the flange portion 42 of the base plate 40 thereof. Each second plate 72 may be a portion of the mount plate 52 that is connected to a mount bracket 50.

Mount plate 52 in exemplary embodiment such as those shown in FIGS. 4 and 5 may be generally supported between and connected to opposing mount brackets 50. The mount brackets 50 may couple the mount plate 52 and cooktop 12 together. The induction element(s) 20 positioned between a mount plate 52 and the cooktop 12 may, through connection of the various components, be in contact with the lower surface 16 of the cooktop 12 with generally no biasing required.

As discussed, in some embodiment a housing 22 may generally surround various components of the appliance 10, such as the induction elements 20, mount brackets 50, and mount plates 52. In some embodiments, the housing 22 may further be connected to the brackets 50. For example, and referring to FIG. 2, in exemplary embodiments, suitable mechanical fasteners 80 may connect the housing 22 to one or more brackets 50. In some embodiments, the mechanical fasteners 80 may extend through and connect the housing 22 and the third plates 64 of the mount brackets 50, as illustrated in FIG. 2. In other embodiments, the mechanical fasteners 80 may extend through and connect the housing 22 and the first plates 60 of the mount brackets 50.

Figure 6:
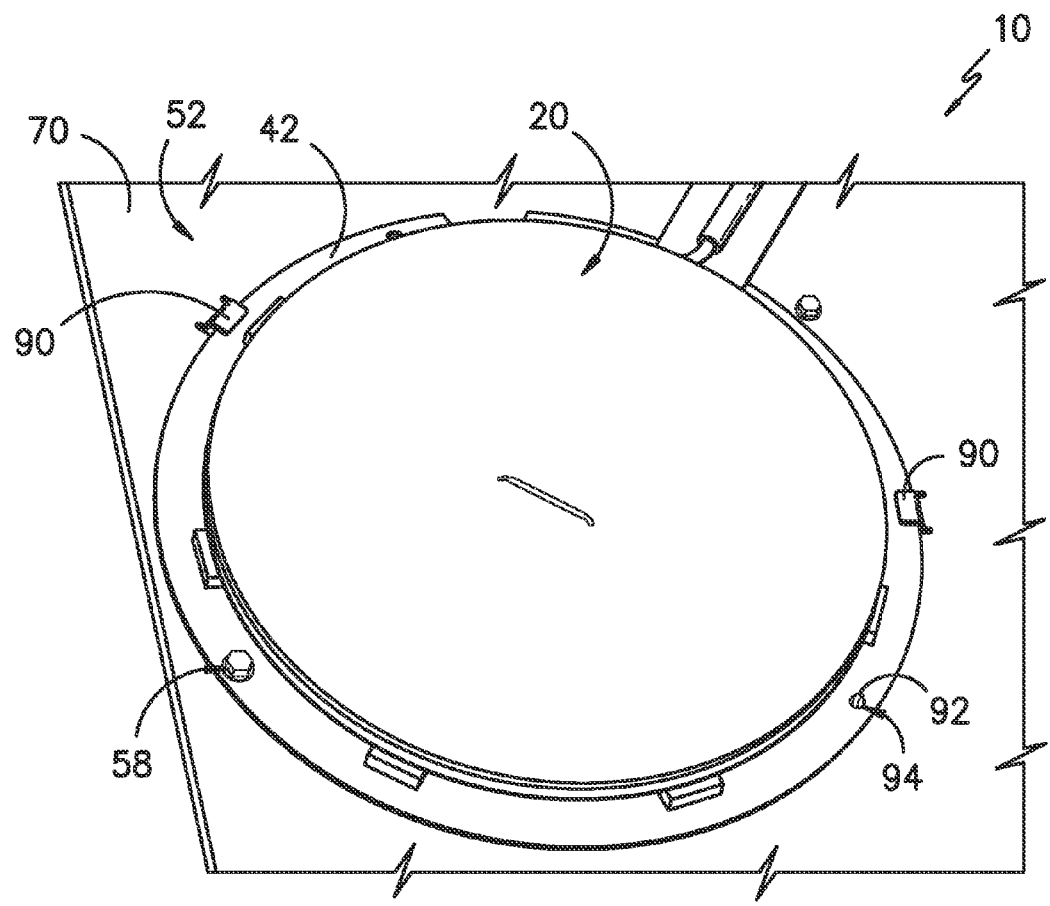
FIG. 6 is a top perspective view of an induction element located relative to and connected to a mount plate in accordance with one embodiment of the present disclosure.

Referring now to FIG. 6, a mount plate 52 may additionally advantageously include various features for locating one or more induction elements 20 relative to the mount plate 52. For example, a mount plate 52 may include one or more clips 90 and one or more pins 92. Each clip 90 and/or pin 92 may be operable to locate an induction element 20 relative to the mount plate 52. For example, the flange portion 42 of the base plate 40 of the induction element 20 may include one or more apertures 94 defined therein. A pin 92 may be mounted in an aperture 94 to at least partially locate the induction element 20 relative to the mount plate 52. Additionally or alternatively, each clip 90 may be sized such that a portion of the flange portion 42 can slide between the clip 90 and the mount plate 52, thus at least partially locating the induction element 20 relative to the mount plate 52. In exemplary embodiments, the locating features may be utilized to locate the induction element 20 relative to the mount plate 52, and the induction element 20 may then be connected to the mount plate 52 such as via suitable mechanical fasteners 58 as discussed herein.

Referring again briefly to FIG. 4, in some embodiments, embossing features 100 may be included and defined in the mount plate 52, such as in the first plate 70 thereof. The embossing features 100 may generally be thin channels defined in the mount plate 50, such as the first plate 70 thereof. Such embossing features 100 may generally strengthen the mount plate 52 and reduce bowing and/or deformation during use in the appliance 10.

The present disclosure is further directed to methods for assembling an induction cooking appliance 10. Advantageously, such methods are simple and efficient, and do not require the use of spring features or other biasing elements. A method may include, for example, the step of connecting one or more mount brackets 50 to the lower surface 16 of the cooktop 12, as discussed herein. A method may further include, for example, the step of connecting one or more induction elements 20 to a mount plate 52, as discussed herein.

A method may further include, for example, the step of connecting the mount plate(s) 52 to the mount bracket(s) 50 such that the induction element(s) 20 contact the lower surface 16 of the cooktop 12, as discussed herein. Further, in exemplary embodiments, when such connection occurs, the inductions element(s) 20 may be generally free from bias along a vertical direction V. Such step may in exemplary embodiments occur after connecting the mount brackets 50 to the lower surface 16 and connecting the induction element(s) 20 to the mount plate 52.

In some embodiments, a method in accordance with the present disclosure may further include the step of locating the induction element(s) 20 relative to the mount plate 52, as discussed herein. In exemplary embodiments, such step may occur before connecting the induction element(s) 20 to the mount plate 52.

In some embodiments, a method in accordance with the present disclosure may further include the step of connecting the mount bracket(s) 50 to the housing 22, as discussed herein. As discussed, when connected to the mount bracket(s) 50, the housing 22 may generally surround the induction element(s) 20, the mount bracket(s) 50, and the mount plate(s) 52.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An induction cooking appliance, the induction cooking appliance defining a vertical direction, a lateral direction, and a transverse direction, the vertical, lateral and transverse directions each perpendicular to each other, comprising:
   a cooktop having an upper surface and an opposing lower surface;
   an induction element positioned below the cooktop in the vertical direction, the induction element contacting the lower surface of the cooktop;
   a mount bracket connected to the lower surface of the cooktop; and
   a mount plate connected to the mount bracket and positioned below the induction element in the vertical direction, the mount plate comprising a first plate and a second plate, the first plate extending within a plane defined by the lateral direction and the transverse direction, the second plate extending in the vertical direction below the first plate and away from the cooktop, the induction element connected to the first plate of the mount plate in a non-biased engagement with the lower surface of the cooktop.

2. The induction cooking appliance of claim 1, wherein the mount bracket is a plurality of mount brackets.

3. The induction cooking appliance of claim 1, further comprising an adhesive connecting the mount bracket and the lower surface of the cooktop.

4. The induction cooking appliance of claim 1, further comprising a mechanical fastener connecting the second plate of the mount plate and the mount bracket.

5. The induction cooking appliance of claim 1, further comprising a mechanical fastener connecting the induction element and the first plate of the mount plate.

6. The induction cooking appliance of claim 1, wherein the induction element is positioned directly between and in contact with the lower surface of the cooktop and mount plate.

7. The induction cooking appliance of claim 1, wherein the induction element is free from bias along the vertical direction.

8. The induction cooking appliance of claim 1, wherein the mount bracket is L-shaped.

9. The induction cooking appliance of claim 1, wherein the mount bracket is U-shaped.

10. The induction cooking appliance of claim 1, wherein the second plate is connected to the mount bracket.

11. The induction cooking appliance of claim 1, wherein the mount plate comprises a clip and a pin disposed on the first plate, the clip and the pin each operable to locate the induction element relative to the mount plate.

12. The induction cooking appliance of claim 1, further comprising a housing, the housing surrounding the induction element, the mount bracket, and the mount plate.

13. A method for assembling an induction cooking appliance, the method comprising:
   connecting a mount bracket to a lower surface of a cooktop, the cooktop comprising an upper surface and the opposing lower surface, including orienting a first plate of a mount plate within a plane defined by a lateral direction and a transverse direction such that a second plate of the mount plate extends in a vertical direction below the first plate and away from the cooktop;
   connecting an induction element to the mount plate; and
   connecting the first plate of the mount plate to the mount bracket such that the induction element contacts the lower surface of the cooktop in non-biased engagement and free from bias along the vertical direction.

14. The method of claim 13, further comprising locating the induction element relative to the mount plate.

15. The method of claim 13, further comprising connecting the mount bracket to a housing, the housing surrounding the induction element, the mount bracket, and the mount plate when connected to the mount bracket.

16. The method of claim 13, wherein the mount bracket is connected to the lower surface of the cooktop with an adhesive.

17. The method of claim 13, wherein the induction element is connected to the first plate of the mount plate with a mechanical fastener and the second plate of the mount plate is connected to the mount bracket with a mechanical fastener.

* * * * *